United States Patent [19]
Murdock et al.

[11] Patent Number: 5,364,030
[45] Date of Patent: Nov. 15, 1994

[54] SOLUTION INJECTOR FOR UNDERGROUND SPRINKLER SYSTEMS

[76] Inventors: James L. Murdock, 1300 Northside Dr., Ormond Beach, Fla. 32174; Charles A. Compton, 116 Sea Sparrow Ct., Daytona Beach, Fla. 32119

[21] Appl. No.: 99,133

[22] Filed: Jul. 29, 1993

[51] Int. Cl.⁵ .............................................. B05B 7/26
[52] U.S. Cl. ............................................ 239/310; 47/48.5
[58] Field of Search ........................ 239/310, 317; 47/48.5 R

[56] References Cited

U.S. PATENT DOCUMENTS

| | | | |
|---|---|---|---|
| 1,632,806 | 6/1927 | Smith | 239/310 |
| 2,230,201 | 1/1941 | Hermann | 239/310 |
| 2,599,678 | 6/1952 | Walker | 239/310 |
| 2,609,232 | 9/1952 | Taulman | 239/310 |
| 2,908,445 | 10/1959 | Schwartz | 239/317 |
| 3,351,290 | 11/1967 | Baldwin | 239/317 |
| 3,419,360 | 12/1968 | Rak | 239/310 |
| 3,833,177 | 9/1974 | Pasley et al. | 239/310 |

*Primary Examiner*—Karen B. Merritt
*Attorney, Agent, or Firm*—Paul S. Rooy

[57] ABSTRACT

A solution injector for underground sprinkler systems comprising an intake pipe connected with a bypass pipe at a system inlet pipe "T", a tank, and an outflow pipe connected at one end to the tank and at the other to the bypass pipe. The intake pipe is connected to the tank through an intake valve and an intake hose, and the solution injector further comprises a bypass valve installed on the bypass pipe between the system inlet pipe "T" and the system outlet pipe "T".

3 Claims, 3 Drawing Sheets

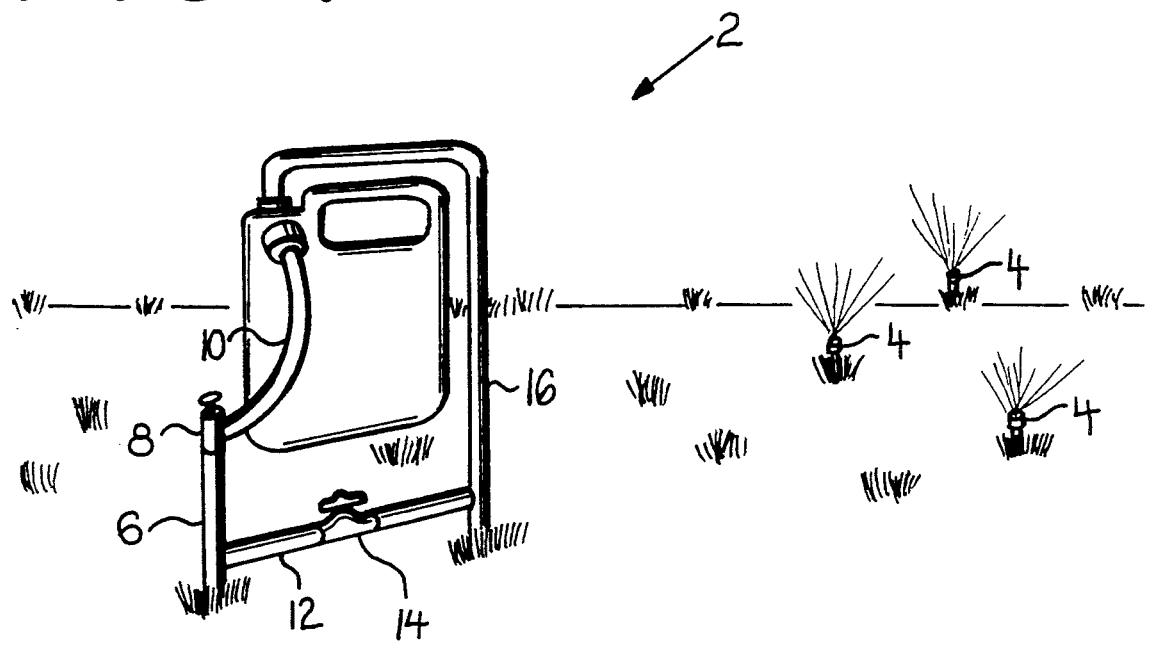
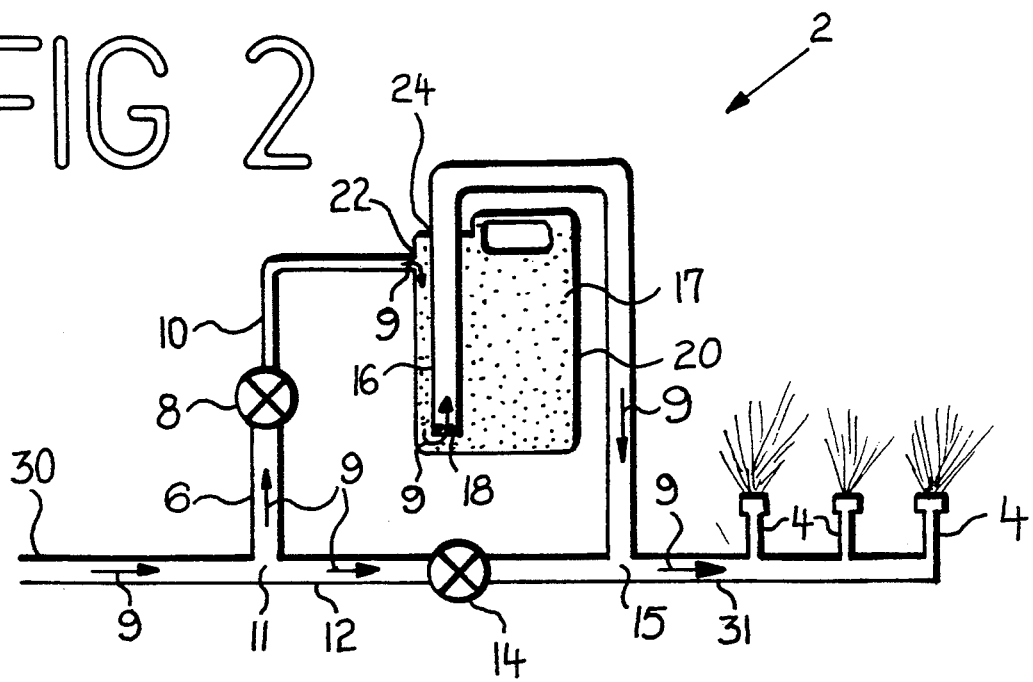

SOLUTION INJECTOR FOR UNDERGROUND SPRINKLER SYSTEMS

BACKGROUND OF THE INVENTION

1. Field of the Invention

The present invention relates to sprinkling system accessories, and in particular to a solution injector for underground sprinkler systems.

2. Background of the Invention

For thousands of years Man has sought improved methods of irrigation. The ancient Egyptians suffered through the annual flooding of the Nile, then planted crops in the well-irrigated flood plain after the waters receded. The Romans used aqueducts, the Chinese used paddies, and donkey-driven pumps were used in the western United States.

More recently, as applied to lawn watering, the underground sprinkler system has become the preferred irrigation method. In this type of irrigation scheme, pressurized water is forced through a network of underground pipes and emerges through sprinkler heads. These sprinkler heads are frequently of the "pop-up" type, which are normally spring-loaded to a retracted, ground level position below the tops of the surrounding grass. Then, in the presence of water pressure within the pipe to which they are connected, they "pop up" into an extended position above the height of the surrounding grass and dispense water spray. In this manner, an underground lawn sprinkler system incorporating "pop-up" sprinkler heads is virtually invisible when not in use.

Improvements on underground sprinkler systems have included means to inject fertilizers, pesticides or the like into the irrigation water sprayed out of the sprinkler heads. This arrangement permits fertilizing or spraying the lawn with pesticides in an efficient end economic fashion.

Given the ease and economy of applying fertilizers, pesticides or the like by means of a solution injector for underground sprinkler systems, it seems difficult to understand why these solution injectors do not enjoy widespread use. However, a review of the currently available devices reveals that these seem to be complex, expensive and difficult to use. In addition, they lack the bypass pipe and valve found to be indispensable to the operation of the instant invention, as well as the outflow pipe holes which have been found to eliminate bubbles in the system. At the sprinkler heads, these bubbles prevent uniform water distribution, so most of the fertilizer, pesticide or the like ends up concentrated around the sprinkler heads. This results in uneven or spotty lawn growth with some areas getting too much fertilizer or pesticide and other areas not enough.

SUMMARY OF THE INVENTION

Accordingly, it is an object of the present invention to provide a solution injector for underground sprinkler systems which provides a smooth, easily regulated flow of injectate into an underground sprinkler system. Design features allowing this object to be accomplished include, in combination, a bypass pipe, a bypass valve, and an intake valve. Benefits associated with the accomplishment of this object include improved injectate entrainment in the irrigation water flow, and simplicity of operation.

It is another object of the present invention to provide a solution injector for underground sprinkler systems which eliminates bubbles in the irrigation water flow. Design features which permit this object to be accomplished include an outflow pipe and outflow pipe holes. Benefits associated with the accomplishment of this object include more uniform injectate distribution.

It is a further object of the present invention to provide a simple solution injector for underground sprinkler systems. Design features which enable the accomplishment of this object include the use of a minimum number of components and off-the-shelf materials such as standard pipes and valves. Benefits associated with the achievement of this object include increased reliability and ease of maintenance, and reduced cost.

BRIEF DESCRIPTION OF THE DRAWINGS

The invention, together with the other objects, features, aspects and advantages thereof will be more clearly understood from the following in conjunction with the accompanying drawings.

Three sheets of drawings are provided. Sheet one contains FIGS. 1 and 2. Sheet two contains FIGS. 3 and 4. Sheet three contains FIGS. 5 and 6.

FIG. 1 is a front isometric view of an installed solution injector for underground sprinkler systems.

FIG. 2 is a schematic side view of a solution injector for underground sprinkler systems.

COMPLETE DESCRIPTION OF THE PREFERRED EMBODIMENT

Figure 3:
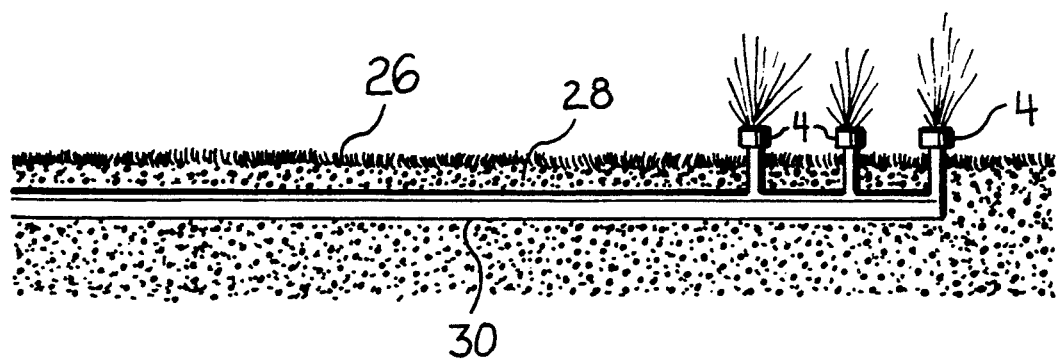
FIG. 3 is a side cross-sectional view of an underground sprinkler system prior to installing a solution injector for underground sprinkler systems.

Referring to FIG. 1, we observe solution injector 2 installed in an underground sprinkler system having sprinkler heads 4, through which irrigating water is dispensed.

FIG. 2 is a schematic view of solution injector 2. Irrigation water flows through solution injector 2 from system inlet pipe "T" 11 to system outlet pipe "T" 15 as indicated by flow arrows 9.

Irrigation water is fed to solution injector 2 from supply pipe 30, and is carried from solution injector 2 to sprinkler heads 4 through sprinkler pipe 31. Commencing at system inlet pipe "T" 11, irrigation water travels to system outlet pipe "T" 15 using two routes: through bypass pipe 12 and bypass valve 14, and through intake pipe 6, intake valve 8, intake hose 10, tank inlet 22, tank 20, and outflow pipe 16 through tank outlet 24. The relative amount of irrigation water flowing through these two routes is determined by the position of intake valve 8 and bypass valve 14.

In operation, tank 20 contains injectate 17 (fertilizer, pesticide, or the like) in liquid form. Irrigation water enters tank 20 from intake hose 10 via tank inlet 22. Tank 20 is sealed such that the only ingress to tank 20 is through tank inlet 22, and the only egress is through tank outlet 24.

Irrigation water enters tank 20 through tank inlet 22, and mixes with injectate 17 in tank 20. Thence the mixture of irrigation water and injectate 17 exits tank 20 through outflow pipe 16. This mixture of irrigation water and injectate 17 combines with irrigation water flowing through bypass pipe 12 at system outlet pipe "T" 15.

Figure 6:
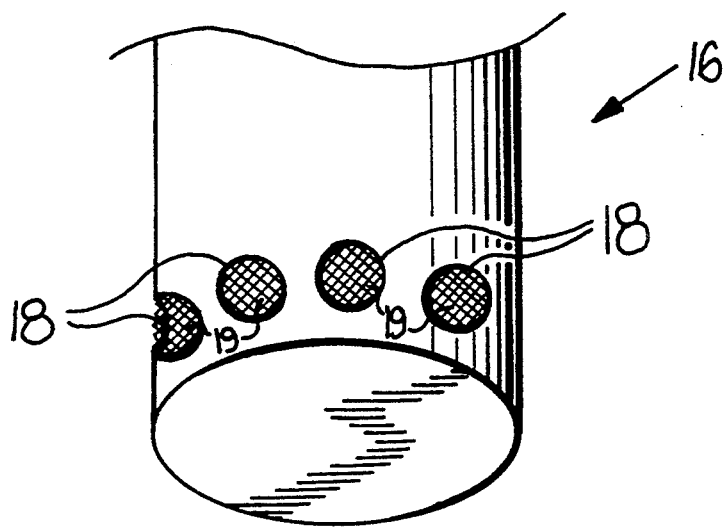
FIG. 6 is a front isometric view of the end of outflow pipe 16 which is connected to tank 20.

Note fluid from tank 20 enters outflow pipe 16 through outflow pipe holes 18. FIG. 6 is a front isometric view of the bottom section of outflow pipe 16, showing outflow pipe holes 18. Outflow pipe holes 18 have been found to reduce air bubbles in the fluid sent to sprinkler heads 4. Therefore, outflow holes 18 are an important design feature of the instant invention, because entrained air bubbles disrupt the flow pattern dispensed by sprinkler heads 4, resulting in uneven application of injectate 17 to the surrounding lawn.

As illustrated in FIG. 6, outlet holes 18 contain screens 19 to prevent particulate matter in tank 20 from being sent to sprinkler heads 4, which could cause sprinkler heads 4 to become clogged.

A classic problem inherent in solution injectors is establishing the correct injectate feed rate into the irrigation water. In combination, intake valve 8 and bypass valve 14 solve this problem in a simple and easily operated fashion.

In operation, the optimum valve settings for valves 8 and 14 were determined experimentally to be: intake valve 8—approximately 100% open, bypass valve 14—approximately 50% open. In the preferred embodiment, valves 8 and 14 were standard, inexpensive off-the-shelf valves.

Figure 5:
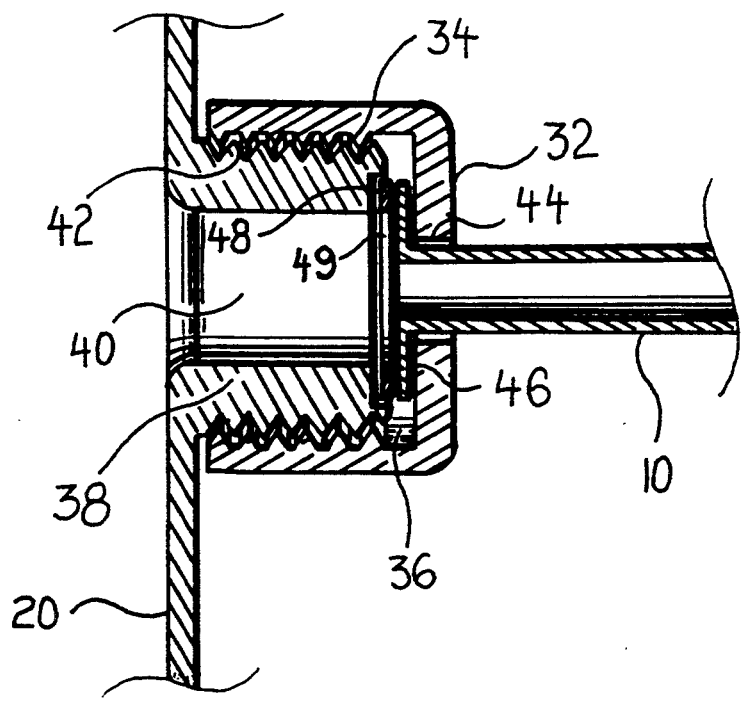
FIG. 5 is a cross-sectional view of the means used in the preferred embodiment of removably attaching intake hose 10 to tank 20.

Intake hose 10 is removably attached to tank 20 to permit injectate 17 to be placed within tank 20. FIG. 5 is a side cross-sectional view of one method of removably attaching intake hose 10 to tank 20.

Tank 20 incorporates male fitting 38 with male fitting bore 40 and male fitting thread 42. Intake hose 10 terminates in intake hose lip 46, which is held in close proximity to male fitting 38 by means of female fitting 32. Female fitting 32 comprises female fitting bore 36 with female fitting thread 34 sized to mate with male fitting thread 42, and female fitting intake hose aperture 44 whose diameter is greater than the outside diameter of intake hose 10 and less than the outside diameter of intake hose lip 46.

Annular gasket 48 having annular gasket bore 49 is sandwiched between male fitting 38 and female fitting 32, and in combination with intake hose lip 46, female fitting 32 and male fitting 38, provides an airtight and watertight seal between intake hose 10 and tank 20. Intake hose 10 communicates with the inside of tank 20 through male fitting bore 40, annular gasket bore 49 and female fitting bore 36.

In the preferred embodiment, system inlet pipe "T" and system outlet pipe "T" were standard PVC pipe fittings. Intake pipe 6, outflow pipe 16 and bypass pipe 12 were PVC pipe. Intake hose 10 was made of standard plumbing flexible metal hose. Tank 20 was a standard, 1 gallon capacity plastic bottle. Intake pipe 6 and outflow pipe 16 were 1 inch in diameter; intake hose 10 was ½ inch in diameter.

Installation

FIG. 3 depicts an underground sprinkler system comprising supply pipe 30 which delivers pressurized water to sprinkler heads 4. Supply pipe 30 is buried under grass 26 in ground 28.

Figure 4:
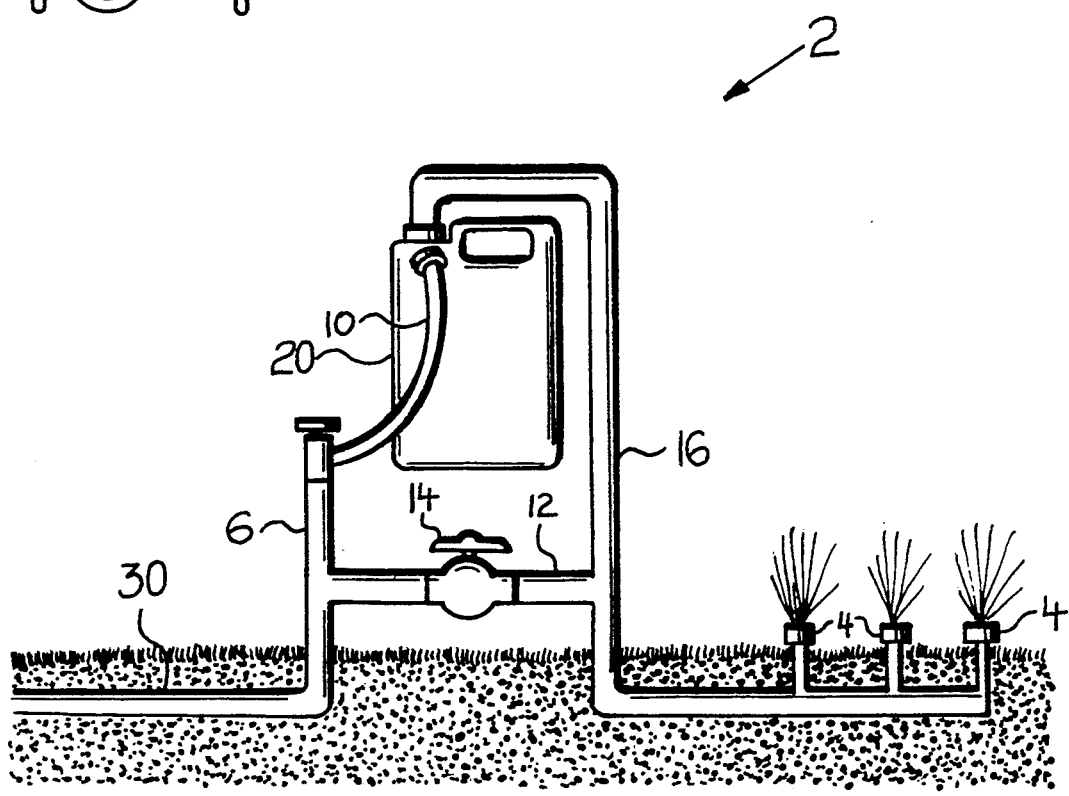
FIG. 4 is a side cross-sectional view of the underground sprinkler system of FIG. 3 after installing a solution injector for underground sprinkler systems.

FIG. 4 depicts solution injector 2 installed in the underground sprinkler system shown in FIG. 3. A section of supply pipe 30 has been removed, and solution injector 2 inserted in its place. In practice, the required section of PVC supply pipe 30 may be easily removed with a hacksaw, and standard PVC pipe fittings (90° elbows, or threaded 90° elbows) may be used to connect solution injector 2 as shown in FIG. 4.

Operation

1. Remove intake hose 10 from tank 20.
2. Place injectate 17 in tank 20. Injectate 17 may be in liquid form, or soluble solid. If the latter, water may be added to solid injectate 17, and injectate 17 should be allowed to dissolve before the solution injector is operated.
3. Re-attach intake hose 10 to tank 20.
4. Open intake valve 8 approximately 100%.
5. Open bypass valve 14 approximately 50%.
6. Within approximately 5 minutes the injectate in tank 20 will have been dispensed. In a multi-zone underground irrigation system, valves 8 and 14 may be closed, the next zone to be treated may be selected, and steps 1-5 repeated for each additional zone to be treated.

While a preferred embodiment of the invention has been illustrated herein, it is to be understood that changes and variations may be made by those skilled in the art without departing from the spirit and scope of the appending claims.

DRAWING ITEM INDEX 2. solution injector
4. sprinkler heads
6. intake pipe
8. intake valve
9. flow arrow
10. intake hose
11. system inlet pipe "T"
12. bypass pipe
14. bypass valve
15. system outlet pipe "T"
16. outflow pipe
17. injectate
18. outflow pipe holes
19. screen
20. tank
22. tank inlet
24. tank outlet
26. grass
28. ground
30. supply pipe
31. sprinkler pipe
32. female fitting
34. female fitting thread
36. female fitting bore
38. male fitting
40. male fitting bore
42. male fitting thread
44. female fitting intake hose aperture
46. intake hose lip
48. annular gasket
49. annular gasket bore

I claim:

1. A solution injector consisting of an intake pipe connected to an intake hose through an intake valve, the end of said intake hose opposite said intake valve having means for removably connecting said intake hose to a tank;

an outflow pipe connected to said tank and extending to a bottom of said tank; and a bypass pipe connected at one end to said intake pipe and at the other to said outflow pipe, said bypass pipe being connected through a bypass valve whereby flow through said bypass pipe is regulated by means of said bypass valve.

2. The solution injector of claim 1 wherein the end of said outflow pipe extending into said tank comprises outflow pipe holes with screens.

3. The solution injector of claim 2 wherein the means for removably connecting said intake hose with said tank consists of:

a male fitting having a male fitting bore with a male fitting thread;

an intake hose lip at the end of said intake hose removably connected with said tank;

a female fitting having a female fitting bore with female fitting thread, and a female fitting intake hose aperture whose diameter is greater than the outside diameter of said intake hose and less than the outside diameter of said intake hose lip; and an annular gasket having an annular gasket bore, said annular gasket being sandwiched between said intake hose lip and said male fitting, said intake hose lip being urged into close proximity with said male fitting by said female fitting, thereby rendering the connection between said intake hose and said tank airproof and waterproof, and easily removable.

* * * * *